United States Patent Office 3,577,386
Patented May 4, 1971

3,577,386
PRODUCT AND PROCESS
John E. Maier, White Bear Lake, Minn., assignor to Minnesota Mining and Manufacturing Company, St. Paul, Minn.
No Drawing. Filed Oct. 7, 1968, Ser. No. 765,676
Int. Cl. C08g 30/14, 30/16
U.S. Cl. 260—47          12 Claims

ABSTRACT OF THE DISCLOSURE

A composition curable to an elastomer having outstanding physical properties, the composition having an epoxy resin, a polyether polyprimary polyamine containing recurring oxytetramethylene units and a tin acylate dissolved therein.

---

This invention relates to improvements in the physical properties of epoxy-amine elastomers, particularly improvements in tensile strength, tear strength and/or elongation at break.

Various compounds have been reported in the literature for use in accelerating the cure or polymerization of epoxide compositions into hardened, nonelastomeric, infusible and insoluble products. Included among the known accelerators are strongly acidic materials such as sulfuric acid, phosphoric acid, etc., aromatic sulfonic acids such as toluenesulfonic acid and benzenesulfonic acid; Lewis acids such as boron trifluoride, stannic chloride, etc.; and boron trifluoride amine complexes such as boron trifluoride monoethylamine, etc. It has been suggested that tin compounds, such as stannous acylates and stannous alkoxides, are effective in accelerating the cure of monoepoxides and polyepoxides, i.e. polyglycidyl ethers (U.S. 3,201,360) and epoxides containing a cyclohexene oxide or cyclopentene oxide group (U.S. 3,117,099). Stannic acylates serve a similar function, as shown in U.S. 3,208,955. Other patents describing the effect of tin salts to accelerate the curing of epoxide compositions include 3,336,251 and 3,344,096. Hardeners, such as polycarboxylic acids and anhydrides, polyfunctional amines and polyols, are customarily included to control the properties of the cured product.

Although various tin compounds have been useful in accelerating the cure of conventional epoxide compositions, to produce characteristically hard and relatively inflexible resins, it has now been found that tin salts will significantly improve the balance of physical properties, including particularly tensile strength, abrasion resistance, tear strength, and elongation at break, of certain amine-cured epoxy elastomers, such as the elastomers of U.S. 3,436,359. When the recently developed elastomers prepared from polyglycidyl ethers and certain polyether diamines, as hereinafter described, are highly filled with conventional reinforcing fillers and the like, some of their more valuable properties are adversely affected. The utility of these elastomers can now be significantly extended by including in the curable system at least one tin salt and preferably a tertiary aliphatic (including araliphatic) amine with a resultant improvement in one or more of the above mentioned physical properties. In particular, the elongation at break is improved by at least 25%, generally by at least 50%, without a significant decrease in the tensile strength and generally with a concomitant increase in tensile strength. At room temperature the tin salts do not serve as accelerators in the amine-epoxy systems of this invention.

One property of such elastomers, indicative of their performance under severe conditions is toughness. A numerical index of toughness can be obtained by multiplying the ultimate tensile strength in pounds per square inch of initial sample cross-section by the increase in length at break divided by the original sample length. In general, for two materials of approximately the same tensile strength, the tougher material is more resistant to abrasion, impact, etc. and tolerates a higher level of filler or reinforcing material for a given set of desired properties. Cut resistance or tear strength, which can be independently determined, generally follows the same improvement pattern as toughness when the above additives are used in the curable system.

The tin compounds of this invention include one or more acylate radicals derived from aliphatic carboxylic acids of from 2 to about 20 carbon atoms by loss of hydrogen. Typical acylate anions include acetate, butyrate, 2-ethylhexanoate, laurate, stearate, oleate, linoleate, adipate

sebacate, naphthenate, and the like. The di- and tetravalent tin salts of hydrocarbon fatty acids having from 2 to 18 carbon atoms are preferred. Although other metal salts soluble in the resin mixtures of this invention may be used to increase the elongation, such as the salts of polyvalent metals of Groups II, III, IV V, VI and VII of the Periodic Table having an atomic number from 13 to 83, inclusive, the tin salts are particularly preferred because they also consistently improve the toughness and the tear strength. Furthermore, the elastomer cured with tin salts is generally not discolored by those salts and has good resistance to heat aging. The useful tin acylates include stannous acylates, such as stannous octoate, stannous oleate, etc. and dialkyl stannic acylates, such as dibutyl tin dilaurate, dioctyl tin dibutyrate, etc., in which the alkyl group has from 1 to about 18 carbon atoms, preferably 2 to 10 carbon atoms. To be soluble in the curable mixture containing polyether polyprimary polyamine and epoxy resin the atomic ratio of carbon to tin in the salt should be at least 4 to 1, preferably at least 8 to 1. At ratios above 40 to 1 the salts tend to plasticize the cured elastomer and reduce the tensile strength.

Although significant improvements in physical properties result from as little as 0.5 or 1 percent by weight of the tin salt based on the weight of uncured total resin (i.e. epoxy plus primary amine), it is usually preferred to employ at least about 4 percent. Amounts greater than about 20 percent can be used, but generally do not provide optimum physical properties because of a plasticizing effect.

While significant improvements are obtained from the addition of one or more tin salts to the polyamine-epoxy mixture, still further improvement is obtained with the addition of at least one basic aliphatic (including heterocyclic) tertiary amine having a basic ionization constant in water at 25° C. of greater than $10^{-7}$. Such improvements include room temperature cures, accelerated cures at elevated temperatures, improved toughness, etc. The substituents on the amino nitrogen may be alkyl (including cycloalkyl) radicals having 1 to about 18 carbon atoms or araliphatic radicals having from 7 to about 18 carbon atoms (e.g. $C_6H_5CH_2$—, $C_2H_5C_6H_4CH_2CH_2$—, $C_{10}H_7CH_2$—). Aromatic radicals connected to the nitrogen atom by a carbon atom of the aromatic ring apparently weaken the basicity of the amine so that it no longer can perform its useful function as a coreactant. Substituents on the aromatic ring of the araliphatic radical or on the aliphatic radical, e.g. —Cl, —NO₂, —OH, etc. are permissible, although they preferably should not be strongly acidic. The preferred compounds should have an ionization constant as acids in water at 25° C. of less than about 10⁻⁴. The strongly acidic substituents, such as —SO₃H, etc. are undesirable because they at least partially neutralize the basic tertiary amine moiety, making it necessary to use higher concentrations of the amine. Illustrative tertiary amines are: triethylene diamine; 2,4,6-tris(dimethylaminomethyl) phenol; dimethylaminoethanol; triethanolamine; N-methyl morpholine, tributyl amine, N-hydroxyethyl morpholine, etc. When used, such tertiary amines are usually present in an amount up to one-half the amount of tin salt, for example between about 0.5 to 10 parts by weight of tertiary amine based on 100 parts of total resin, i.e. epoxy plus primary amine.

Any of a large number of epoxy resins can be used in the practice of this invention. These may include monoepoxides when used in conjunction with polyepoxides. If a mixture of epoxy resins is employed, it is important that the oxirane equivalence (i.e. number of oxirane equivalents per mole of epoxy resin) be greater than 1, preferably at least 1.5. The epoxy resins having a higher content of aromatic or condensed ring structures generally produce a final vulcanizate which is superior in load bearing properties but somewhat lower in ultimate elongation. Monoepoxides which may be included to advantage, particularly when mixes of lower viscosity are desired, include glycidyl ether of m-pentadecenyl phenol, butyl glycidyl ether, phenyl glycidyl ether and allyl glycidyl ether.

Illustrative epoxy coreactants useful in this invention generally include the glycidyl polyethers of dihydric phenols [e.g. the diglycidyl ether of 2,2-bis(4-hydroxyphenyl) propane and its dimers, trimers, and low molecular weight polymers having a 1,2-oxirane equivalence greater than one] such as are described in U.S. 2,801,229. Also useful are the cycloaliphatic epoxides having a 1,2-oxirane equivalence greater than one, such as vinyl cyclohexene dioxide, dipentene dioxide and the like. Aliphatic epoxides, such as the polyglycidyl ethers of aliphatic diols and polyols or butadiene diepoxide, are satisfactorily cured by the system of this invention, but the physical properties are not greatly improved over those of the metal free system. A particularly preferred class of polyepoxide resins is derived from the reaction of epichlorohydrin with bisphenol A. This class may be represented by the formula

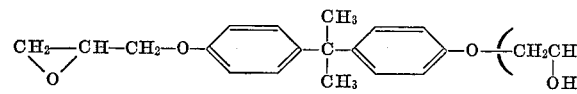 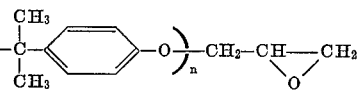

In this formula $n$ may have a value of between 0 and about 10. The structure of this diepoxide resin class may be described by reference to either its melting points or, more usually, to its oxirane equivalent weight. Thus, when $n$ has a value of 0 the resin has an oxirane equivalent weight of 170 and when $n$ has a value of 10 the resin has an oxirane equivalent weight of 1590. The polyepoxide resin employed for the purpose of this invention is usually a mixture of compounds and will generally have an oxirane equivalent weight ranging from 170 to 1590, but lower and higher equivalent weight epoxy resins may be employed to advantage. Other useful illustrative epoxy resins are described in British Pat. No. 988,632.

The primary amine resin component of the curing system is at least one water insoluble polyether polyprimary polyamine having a molecular weight of at least 3500, preferably 5000 to 30,000 (particularly 5000 to 15,000) and having a primary amino terminal group attached directly to each end of a polyether moiety containing recurring groups of which at least a major portion is oxytetramethylene recurring units and at most a minor portion is thioalkylene or another oxyalkylene having from 2 to 6 chain carbon atoms. At least half of the primary amino terminal groups have the structure —OC₄H₈NH₂. The polyether moiety contains less than about 3 percent by weight of secondary amino nitrogen atoms and less than about 0.3 percent by weight of tertiary amino nitrogen atoms in the main polymer chain. In one technique, these polyether polyprimary amines may be prepared by reacting tetrahydrofuran and up to about 40 mole percent of another cationically polymerizable cyclic ether or thioether in the presence of trifluoromethanesulfonic anhydride at temperatures from about —40° C. to +80° C. in a polymerization system which is relatively free of, i.e. which contains at most only minor amounts of, monoalkylatable chain terminating agents to produce a polymer having a high degree of cationic activity at both ends of the polymer chain. Suitable cationically polymerizable cyclic ether comonomers having from 2 to 6 ring carbon atoms include oxacycloheptane; 3,3-bis(chloromethyl) oxacyclobutane; phenyl glycidyl ether; propylene oxide; ethylene sulfide; epichlorohydrin; 2-methyl tetrahydrofuran; etc., all of which introduce from 2 to 6 carbon atoms into the polyether chain. The molecular weight of the dicationically active polyether varies in an inverse manner with the concentration of trifluoromethanesulfonic anhydride, and a 1/100 to 1/7000 molar ratio of trifluoromethanesulfonic anhydride to cyclic ether monomer is desired for the production of dicationically active polyethes having molecular weights from about 3500 to about 250,000 in a conversion of about 50%. The dicationically active polyethers are strong alkylating agents and react with ammonia to add primary amino radicals to the cationally active terminal sites. From stoichiometric to excess amounts of ammonia are preferred in this reaction, and a temperature from about —100° C. to about +60° C. is generally suitable, although the lower temperatures are generally preferred to moderate the rate of reaction. Solvents which are inert to alkylation reactions, such as methylene chloride, trichlorofluoromethane and cyclohexane, may be employed. Depending on the concentration ratio of ammonia to the dicationically active polyether, the polyamine product can contain secondary or tertiary amine groups, internally situated in the essentially linear polyether moiety, since the terminal primary amino radical can be further alkylated by another cationically active polymer molecule. The presence of tertiary amino nitrogen atoms in the polymer chain can provide some branched chains with recurring units similar to those in the main polymer chain, but the molecule may still be considered to be essentially linear. For the preparation of a polyether diprimary diamine a large excess of ammonia, generally at least a five-fold excess, is preferably used.

There are generally two methods of reacting the epoxy-primary amine mixture (from about 1/1 to about 35/1 oxirane/amine equivalence ratio) of this invention. The first involves mixing the polyether polyprimary polyamine and the tin salt with the epoxy resin, either with or without solvents, and the direct conversion to a vulcanized elastomeric state at elevated temperature or at room temperature if a tertiary amine is used. This process is commonly referred to as an "A-stage" procedure. An alternative method of producing these vulcanizates involves a prereaction of the polyether polyprimary amine with the epoxy resin to form an adduct which is still soluble and processable. To the resulting adduct is added the tin salt and, when used, a tertiary amine, and the reaction is completed at elevated temperature or at room temperature when tertiary amine is present. This process is normally referred to as a "B-stage" procedure. Adducts of this type may convenitntly be prepared by the reaction of these polyether polyprimary polyamines and an epoxy resin in a 50% solution of the mixed resins in toluene or other suitable solvent at a reflux temperature for a period of about 2 to 8 hours. In the B-stage reaction it is normally desirable to employ an oxirane/amine equivalence ratio of at least 1.5 to 1, preferably at least 2.5 to 1. The oxirane/amine equivalence ratio is defined as the number of oxirane equivalents present in the total weight of epoxy resin divided by the number of amine-attached, active hydrogen equivalents present in the total weight of the polyether polyprimary amine.

The cured products of this invention are particularly characterized by extremely low brittle points, hydrolytic stability, high tensile strength, good elongation, high coefficient of friction, outstanding abrasion resistance, index of toughness, tear strength, high resilience, good chemical resistance and outstanding adhesive characteristics. These elastomers find utility in the manufacture of such rubber goods as tires, golf balls, skid resistant pads, textile and paper processing rollers, shoe soles, etc. The properties of the resulting vulcanizates make the uncured mixtures extremely valuable in the preparation of coatings, polishes, paints and finishes for textiles, leather, metals, palstics, rubbers, concrete, wood, etc. The cured resins adhere very tenaciously to leather and accordingly are useful as finishes for shoe uppers, as coatings for leather pulley belts to impart skid resistance and as adhesives for the repair of holes or cracks in shoe uppers or soles. These vulcanizates adhere extremely well to most substrates. Thus, they are useful for bonding materials to glass, metals, concrete, textiles, rubbers, plastics, wood, etc. In all their uses the resins may be applied with or without a wide variety of filler materials, e.g., silica, carbon, talc, titanium dioxide, etc.

The following examples will illustrate the invention.

EXAMPLE 1

For evaluation of the metal salts, a convenient sample is prepared by casting the liquid into a sheet, curing the sheet, cutting dumbbell-shaped test samples and determining the physical properties of the samples.

A standard formulation of liquid casting material is prepared by combining:

| | Parts |
|---|---|
| Polytetramethyleneoxidediprimarydiamine (M.W. 10,500, as calculated by doubling the primary amine equivalent weight) | 16 |
| Diglycidyl ether of 2,2 - bis(4-hydroxyphenyl)propane mixture (190–200 equivalent weight) | 5.8 |
| Phenothiazine (antioxidant) | 0.2 |
| Tris(dimethylaminomethyl) phenol ("DMP30") | 0.3 |
| Metal salt (as indicated in Table I). | |

This mixture provides an oxirane amine equivalence ratio of about 4.5. The materials are thoroughly mixed for several minutes in a 250 cc. disposable paper container. The mixture is then poured into a motor-driven aluminum centrifugal casting cup about 10 cm. in diameter and 10 cm. deep. The cup is rotated at about 3000 r.p.m. at ambient temperatures until the resin is tack free, which usually requires 24 to 48 or, in some cases, even 72 hours. The resulting film, about 0.1 cm. thick, is then stripped from the cup and post-cured for about 3 hours at about 100° C. Test samples are prepared and tested in general accordance with ASTM Test Method D 412–51T, using Die C, and ASTM Test Method D 624–54, using Die C. As indicated in Runs 5 and 8, salts of halogen acids, instead of carboxylic acids, produce products which break at low stress and are relatively soft; moreover, these products also show poor resistance to aging.

EXAMPLE 2

In this example a variety of tertiary amines are evaluated. Some caused a slower reaction than the tertiary amine ("DMP30") of Example 1, so higher temperatures and longer times for cure are adopted throughout, casting being done at 70–110° C. for periods of ¼ hour to 21 hours, depending on the tertiary amine. All samples are post-cured for three hours at 100° C. for uniformity.

The formulation used is the same as in Example 1, except that the primary amine resin has a molecular weight of about 12,000, all samples contain 1.7 grams of stannous octoate and the quantity of amine was adjusted, as indicated in Table II, to provide essentially the same amount of tertiary amino nitrogen. In preliminary tests, it is found that none of the formulations (except those containing "DMP30" and 2 - ethyl - 4 - methylimidazole, which was a weak film, as shown by Run 1 of Table I) result in a self-supporting film under the cure conditions described if the stannous octoate is omitted. Some of the tertiary amines (triethanolamine, tributylamine) yield vulcanizates having greater clarity than those from "DMP30."

TABLE I

| | | | Tensile strength | | | | | |
|---|---|---|---|---|---|---|---|---|
| Run | Metal salt | Grams | At 100% elongation, p.s.i. | At break, p.s.i. | Elongation at break, percent | Toughness index ×10⁻⁴ | Hardness, Shore A | Tear strength, pounds per linear inch (p.l.i.) |
| 1 | None | | 570 | 2,200 | 260 | 0.57 | 74 | 85 |
| 2 | Stannous octoate | 1.7 | 225 | 4,580 | 660 | 3.02 | 56 | 376 |
| 3 | Stannous oleate [1] | 4.6 | 270 | 4,000 | 580 | 2.32 | 61 | 186 |
| 4 | Stannous naphthenate | 1.7 | 265 | 4,000 | 580 | 2.32 | 61 | 246 |
| 5 | Stannous chloride | 2.0 | 145 | 1,440 | 600 | 0.86 | 35 | 120 |
| 6 | Dibutyl tin dilaurate [1] | 3.5 | 305 | 4,050 | 540 | 2.19 | 46 | 188 |
| 7 | Dibutyl tin dilaurate | 5.0 | 275 | 2,750 | 620 | 1.70 | 53 | 123 |
| 8 | Dioctyl tin dichloride | 3.2 | 130 | 305 | 230 | .07 | 45 | |

[1] Post-cured 6 hours at 100° C.

TABLE II

| | | Tensile strength | | | | |
|---|---|---|---|---|---|---|
| Amine | Grams | At 100% elongation, p.s.i. | At break, p.s.i. | Elongation at break, percent | Hardness, Shore A | Tear, strength (p.i.i.) |
| "DMP 30" | 0.3 | 320 | 6,500 | 680 | 63 | 280 |
| Dimethylamino ethanol | 0.3 | 175 | 3,980 | 720 | 54 | 185 |
| Triethanol amine | 0.5 | 140 | 4,400 | 780 | 52 | 170 |
| N-methylmorpholine | 0.35 | 155 | 2,700 | 640 | 49 | 158 |
| Tributylamine | 0.65 | 175 | 4,025 | 720 | 53 | 194 |
| N-hydroxyethylmorpholine | 0.45 | 155 | 3,100 | 660 | 52 | 176 |
| Triethylene diamine | 0.2 | 185 | 3,550 | 620 | 51 | 304 |
| 2-ethyl-4-methylimidazole | 0.35 | 460 | 5,955 | 580 | 69 | 272 |

EXAMPLE 3

The maximum tensile strength of the cured elastomer depends both on the amount of tertiary amine and the metal salt/tertiary amine ratio. Generally, even small amounts of tertiary amine improve the tensile strength of the product, and increasing the amount of amine increases the tensile strength. However, each amine appears to have an optimum concentration, beyond which tensile strength is not further improved and may even decrease. This optimum appears to occur between a concentration of 1 and a concentration of 10 parts of amine per hundred parts of total resin. Table III illustrates these relationships for the case of stannous octoate and "DMP30." Formulation and curing conditions are as in Example 1.

It appears that the optimum weight ratio of metal salt to "DMP30" is at least about 2.

EXAMPLE 4

As mentioned previously, at least one equivalent of epoxy per primary amino hydrogen atom is required for the preparation of useful elastomers. As the relative amount of epoxy increases, the resulting polymer becomes increasingly crosslinked, acquiring the characteristics of an elastic plastic rather than an elastomer. This effect is illustrated in Table IV.

The formulation used is:

|  | Grams |
|---|---|
| Polyether diprimary diamine of Example 1 and epoxy resin of Example 1, total | 24 |

TABLE III

| "DMP 30" (phr.) | | Stannous octoate (phr.) | | | | | | |
|---|---|---|---|---|---|---|---|---|
| | | 0 | 1 | 2 | 4 | 8 | 10 | 12 |
| 0.8 | $M_{100}$, p.s.i. | 335 | 387 | 380 | 270 | 366 | 318 | 288 |
| | T, p.s.i. | 3,107 | 3,493 | 4,405 | 4,776 | 4,497 | 4,051 | 3,710 |
| | E, percent | 338 | 330 | 425 | 602 | 587 | 585 | 602 |
| | H | 63 | 62 | 63 | 54 | 63 | 64 | 63 |
| 2.4 | $M_{100}$, p.s.i. | 547 | 402 | 503 | 421 | 470 | 443 | 465 |
| | T, p.s.i. | 2,152 | 2,670 | 2,512 | 4,583 | 5,080 | 5,122 | 4,903 |
| | E, percent | 216 | 284 | 255 | 391 | 558 | 593 | 598 |
| | H | 68 | 62 | 71 | 66 | 67 | 69 | 72 |
| 4.0 | $M_{100}$, p.s.i. | 622 | 583 | 504 | 583 | 611 | 464 | 527 |
| | T, p.s.i. | 2,173 | 2,213 | 2,677 | 3,197 | 4,077 | 4,713 | 4,435 |
| | E, percent | 204 | 218 | 260 | 285 | 482 | 568 | 563 |
| | H | 71 | 63 | 63 | 70 | 71 | 72 | 76 |

$M_{100}$ signifies tensile strength at 100% elongation.
T signifies ultimate tensile strength.
E signifies ultimate elonagtion.
H signifies hardness in Shore A units.
Phr. signifies parts per hundred parts of total resin (i.e. epoxy and primary amine).

It should be noted that the use of tin salts in conjunction with a tertiary amine significantly extends the useful elastomeric range of the mixtures. In general usage, an elastic plastic may be considered to have an elongation at break less than about 100% of its initial length, while an elastomer may be considered to have about 100% or more. In the absence of the tin salt, the elastomeric range is limited, in the case of the particular diprimary amine and epoxy illustrated here, to oxirane/amine equivalence ratios below about 12/1; use of tin salt and tertiary amine extends the elastomeric range as far as about 35/1. However, these higher ratio materials tend to be lower in both ultimate tensile strength and lower in elongation than the lower ratios, and produce material principally suitable for such purposes as contained gaskets and protective coatings. For general purpose elastomers, suitable for such uses as O-rings for moving seals or highly abrasion resistant coatings, a ratio of about 1.5/1 to 10/1 is preferred. This preferred range is most applicable in the case of diprimary diamine resins with a molecular weight from 5000 to 15,000. Higher molecular weight diprimary diamines tolerate higher oxirane/amine equivalence ratios with retention of elastomeric properties, perhaps because of the correspondingly greater average distance between crosslinks in the polymeric product structure.

EXAMPLE 5

Table V illustrates the effect of the use of a tin salt and a tertiary amine in the curing of several cycloaliphatic epoxy resins. The formulation employed here is as follows:

TABLE IV

| Oxirane/diamine equivalence ratio | Tensile strength | | Elongation at break, percent | Toughness index ×10⁻⁴ | Hardness, Shore A | Tear strength, p.l.i. |
|---|---|---|---|---|---|---|
| | At 100% elongation, p.s.i. | At break p.s.i. | | | | |
| 2.5/1 | 245 | 3,790 | 430 | 1.63 | 59 | |
| 2.5/1 plus stannous octoate | 315 | 5,350 | 550 | 2.94 | 59 | |
| 3.5/1 | 285 | 3,160 | 360 | 1.14 | 64 | |
| 3.5/1 plus stannous octoate | 250 | 5,580 | 590 | 3.29 | 57 | |
| 5/1 | 800 | 2,800 | 240 | .67 | 70 | |
| 5/1 plus stannous octoate | 280 | 5,410 | 550 | 2.98 | 65 | |
| 7.5/1 | 1,175 | 3,200 | 200 | .64 | 77 | |
| 7.5/1 plus stannous octoate | 660 | 4,855 | 450 | 2.18 | 74 | |
| 10/1 | 2,500 | 3,400 | 150 | .50 | 88 | 180 |
| 10/1 plus stannous octoate | 1,500 | 4,160 | 240 | 1.0 | 80 | 300 |
| 20/1 | | 3,600 | 60 | .22 | 99 | 170 |
| 20/1 plus stannous octoate | 2,200 | 4,300 | 210 | .90 | 90 | 250 |
| 25/1 | | 4,120 | 40 | .16 | | 73 |
| 25/1 plus stannous octoate | | 4,225 | 120 | .51 | | 212 |
| 35/1 | | 4,550 | 30 | .14 | | 16 |
| 35/1 plus stannous octoate ¹ | | 3,620 | 110 | .40 | | 230 |

¹ 1.8 grams used here.

|  | Grams |
|---|---|
| Phenothiazine | 1.4 |
| "DMP30" | 0.4 |
| Stannous octoate | 1.2 |

The oxirane/diamine equivalence ratio is listed in Column 1 of Table IV. Alternate lines compare the same ratio with and without metal salt, as indicated. All mixes are cured at room temperature until tack free, and then post-cured at 100° C.

For comparison the above formulation with an oxirane/diamine equivalence ratio of 5/1, except that the "DMP30" was omitted, has the following properties:

5/1+stannous octoate, without tertiary amine:
Tensile strength at 100% elongation—164 p.s.i.
Tensile strength at break—3500 p.s.i.
Elongation at break—670%
Hardness Shore A—50

|  | Parts |
|---|---|
| Polytetramethyleneoxide diprimary diamine (M.W. about 11,500) and epoxy resin | 100 |
| DMP30 | 2.5 |
| Stannous octoate | 10 |

The oxirane/amine equivalence ratio in each case is 4.5/1. The mixes were cured until tack free at 110° C., and then post-cured for 3 hours at 100° C.

EXAMPLE 6

The use of a combination of tertiary amine (DMP30) and tin salt (stannous octoate) in the cure of lower molecular weight polytetramethyleneoxide diprimary diamines is illustrated in Tables VI and VII. In Table VI the molecular weight of the diprimary diamine resin is 7700, and it is used to cure the epoxy resin of Example 1 at various oxirane/amine equivalence ratios in the presence of stannous octoate (about 11 parts per 100 parts of total resin) and/or DMP30 (about 2 parts per 100 parts of total resin), as shown. Cure took place at about 110° C. for 1-2 hours, followed by post-cure for 3 hours at 100° C.

free, and then the products are post-cured 3 hours at 100° C. Results are shown in Table VIII.

As stated previously, the use of tin salts in the curing formulations of this invention leads to the formation

TABLE V

| Epoxy resin | Tensile strength | | Elongation at break, percent | Hardness, Shore A |
|---|---|---|---|---|
| | At 100% elongation, p.s.i. | At break, p.s.i. | | |
| Vinyl cyclohexene dioxide | 45 | 270 | [1] 820 | 37 |
| Vinyl cyclohexene dioxide plus stannous octoate | 124 | 2,515 | 660 | 50 |
| Alicyclic diepoxy carboxylate (equivalent weight 140) | Did not cure to self-supporting film | | | |
| Alicyclic diepoxy carboxylate (equivalent weight 140) plus stannous octoate | 165 | 4,000 | 640 | 53 |
| Alicyclic diepoxy adipate (equivalent weight 213) | Did not cure to self-supporting film | | | |
| Alicyclic diepoxy adipate (equivalent weight 213) plus stannous octoate | 135 | 2,580 | 610 | 49 |

[1] Permanent set 449%; not an elastomer.

TABLE VI

| Oxirane/amine equivalence ratio | Tensile strength | | Elongation at break, percent | Toughness index ×10⁻⁴ | Hardness, Shore A | Tear strength, (p.l.i.) |
|---|---|---|---|---|---|---|
| | At 100% elongation, p.s.i. | At break, p.s.i. | | | | |
| 1.7/1 | 280 | 1,410 | 250 | .35 | 62 | 78 |
| 1.7/1 plus stannous octoate | 450 | 4,860 | 430 | 2.19 | 69 | 190 |
| 2.7/1 | 444 | 2,055 | 230 | .47 | 69 | 109 |
| 2.7/1 plus stannous octoate | 461 | 4,800 | 480 | 2.30 | 69 | 276 |
| 4.7/1 | 1,410 | 2,930 | 160 | .47 | 78 | 120 |
| 4.7/1 plus stannous octoate | 720 | 5,550 | 460 | 2.55 | 75 | 279 |

TABLE VII

| Oxirane/amine equivalence ratio | Tensile strength | | Elongation at break, percent | Toughness index ×10⁻⁴ | Hardness, Shore A | Tear strength, p.l.i. |
|---|---|---|---|---|---|---|
| | At 100% elongation, p.s.i. | At break, p.s.i. | | | | |
| 1.8/1 | 660 | 1,275 | 150 | .19 | 70 | 65 |
| 1.8/1 plus stannous octoate | 725 | 2,560 | 240 | .61 | 74 | 126 |
| 2.1/1 | 990 | 1,590 | 140 | .22 | 75 | 74 |
| 2.1/1 plus stannous octoate | 785 | 2,180 | 220 | .48 | 71 | 118 |
| 2.8/1 | 1,655 | 2,120 | 120 | .25 | 83 | 90 |
| 2.8/1 plus stannous octoate | 1,070 | 2,710 | 230 | .62 | 76 | 132 |
| 4.3/1 | | 2,895 | 95 | .26 | 90 | 85 |
| 4.3/1 plus stannous octoate | 2,055 | 3,360 | 175 | .59 | 87 | 142 |

In Table VII the molecular weight of the diprimary diamine resin is 3800, and it was used to cure the epoxy resin of Example 1 in the presence of stannous octoate (about 11 parts per 100 parts of total resin, i.e. phr.) and/or "DMP30" (about 3 phr.), as shown. Cure took place in 1-3 hours at 110° C., and each product was post-cured 3 hours at 100° C.

EXAMPLE 7

A copolymeric diprimary diamine resin is prepared consisting of about 87 mole percent of recurring units derived from tetrahydrofuran and about 13% of recurring units derived from α-methyltetrahydrofuran. This resin is cured at a 5/1 oxirane/amine equivalence ratio with the epoxy resin of Example 1, using 1.4 phr. of "DMP30." Curing takes place at 110° C. until tack of elastomeric vulcanizates having a superior index of toughness. Although the reason for this is somewhat obscure, there is some basis for attributing the result to a lower crosslinking density of the vulcanizate than would be obtained in the absence of the tin salt.

The reactions occurring simultaneously during curing include: (1) the oxirane-primary amine reaction to give the ring-opened epoxide joined to a newly formed secondary amine, (2) the oxirane-secondary amine reaction to give another ring-opened epoxide joined to a newly formed tertiary amine, and (3) the oxirane homopolymerization reaction to give recurring segments of the ring-opened epoxide containing no interspersed polyether polyamine moieties. Reaction (1) is a chain-extending reaction which serves to increase the molecular weight of the essentially linear polymer. Reaction (2), on the other hand, is a crosslinking reaction. Reaction (3)

TABLE VIII

| Oxirane/amine equivalence ratio | Tensile strength | | Elongation at break, percent | Toughness index ×10⁻⁴ | Hardness, Shore A | Tear strength, p.l.i. |
|---|---|---|---|---|---|---|
| | At 100% elongation, p.s.i. | At break, p.s.i. | | | | |
| 5/1 | 290 | 1,950 | 320 | .62 | 61 | 84 |
| 5/1 plus stannous octoate | 195 | 3,860 | 720 | 2.8 | 56 | 182 | may be viewed as one which is neither a crosslinking nor chain-extending reaction, but rather one which serves to introduce hard, polymeric segments into the otherwise soft polymeric composition. It is believed that the tin salt changes the reaction rates of (1) and (2) above in such a fashion that the crosslinking density of the final vulcanizate is decreased. This would entail either an acceleration of reaction (1) or a retardation of reaction (2) through the action of the tin salt. It seems probable that the surprising effects that the tin salt exerts can be attributed to the unanticipated change in the relative rates of reactions (1) and (2). Where an appropriate tertiary amine is also present in the curing formulation, it is believed that it functions almost exclusively to accelerate reaction (3). Further indication that the tin salts operate in such a manner is the fact that they do not act in the epoxy-primary amine systems of this invention as an accelerator or promoter at room temperatures. Metal salts have been proposed for addition to conventional amine cured epoxy systems to reduce "tack time," i.e. increase the rate of cure of the resin system from liquid to plastic form. In contrast, the liquid mixtures of Example 4, in the absence of tin salts, cure to a tack-free (non-sticky) state in about 24 hours or less at room temperature, while the same mixtures formulated with stannous octoate, require at least 48 and at times 72 hours or more to achieve a tack-free state, indicating a much lower rate of crosslinking in the metal salt-containing compositions.

What is claimed is:

1. A composition curable to an elastomer comprising
   (a) at least one epoxy resin selected from the group consisting of glycidyl polyethers of dihydric phenols and cycloaliphatic epoxides having more than one oxirane equivalent per mole;
   (b) at least one water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of different oxyalkylene or thioalkylene recurrin gunits having from 2 to 6 straight chain carbon atoms, at least half of said primary amino terminal groups having the structure $-OC_4H_8NH_2$, said polyether moiety having less than about three percent by weight of secondary amino nitrogen atoms and less than about 0.3 percent by weight of tertiary amino nitrogen atoms in its essentially linear chain, the oxirane/amine equivalence ratio of said epoxy resin and said polyamine being from 1/1 to about 30/1; and
   (c) dissolved therein, at least 0.5 weight percent, based on the total weight of said epoxy resin and said polyether polyamine, of at least one tin acylate of an aliphatic carboxylic acid having from 2 to 20 carbon atoms.

2. The composition of claim 1 in which the molecular weight of said polyamine is from 3500 to 15,000 and said oxirane/amine equivalence ratio is from 1.5/1 to 10/1.

3. The composition of claim 1 in which said tin acylate is a stannous acylate.

4. The composition of claim 1 in which the atomic ratio of carbon to tin in the salt is at least 4 to 1.

5. The composition of claim 1 in which said tin acylate is present in an amount of at least 4 percent, based on the total weight of said epoxy resin and said polyether polyamine.

6. The composition of claim 1 containing up to half the weight of said tin acylate of a basic aliphatic tertiary amine having a basic ionization constant in water at 25° C. of greater than $10^{-7}$.

7. The composition of claim 6 in which said basic tertiary amine has a basic ionization constant in water at 25° C. of at least $10^{-7}$ and an acid ionization constant in water at 25° C. of less than about $10^{-4}$.

8. The composition of claim 1 in which said recurring units of said polyamine consist of oxytetramethylene.

9. An elastomer comprising the cured product of
   (a) at least one epoxy resin selected from the group consisting of glycidyl polyethers of dihydric phenols and cycloaliphatic epoxides having more than one oxirane equivalent per mole;
   (b) at least one water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of different oxyalkylene or thioalkylene recurring units having from 2 to 6 straight chain carbon atoms, at least half of said primary amino terminal groups having the structure $-OC_4H_8NH_2$, said polyether moiety having less than about three percent by weight of secondary amino nitrogen atoms and less than about 0.3 percent by weight of tertiary amino nitrogen atoms in its essentially linear chain, the oxirane/amine equivalence ratio of said epoxy resin and said polyamine being from 1/1 to about 30/1; and
   (c) dissolved therein, at least 0.5 weight percent, based on the total weight of said epoxy resin and said polyether polyamine, of at least one tin acylate of an aliphatic carboxylic acid having from 2 to 20 carbon atoms.

10. An elastomer comprising the cured product of
    (a) at least one epoxy resin selected from the group consisting of glycidyl polyethers of dihydric phenols and cycloaliphatic epoxides having more than one oxirane equivalent per mole;
    (b) at least one water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of different oxyalkylene or thioalkylene recurring units having from 2 to 6 straight chain carbon atoms, at least half of said primary amino terminal groups having the structure $-OC_4H_8NH_2$, said polyether moiety having less than about three percent by weight of secondary amino nitrogen atoms and less than about 0.3 percent by weight of tertiary amino nitrogen atoms in its essentially linear chain, the oxirane/amine equivalence ratio of said epoxy resin and said polyamine being from 1/1 to about 20/1;
    (c) dissolved therein, at least 0.5 weight percent, based on the total weight of said epoxy resin and said polyether polyamine, of at least one tin acylate of an aliphatic carboxylic acid having from 2 to 20 carbon atoms, and
    (d) a basic aliphatic tertiary amine having a basic ionization constant in water at 25° C. of greater than $10^{-7}$ in an amount up to one-half the weight of said tin acylates.

11. A process for preparing an elastomer which comprises admixing
    (a) at least one epoxy resin selected from the group consisting of glycidyl polyethers of dihydric phenols and cycloaliphatic epoxides having more than one oxirane equivalent per mole;
    (b) at least one water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of different oxyalkylene or thioalkylene recurring units having from 2 to 6 straight chain carbon atoms, at least half of said primary amino terminal groups having the structure $-OC_4H_8NH_2$, said polyether moiety having less than about three percent by weight of secondary amino nitrogen atoms and less than about 0.3 percent by weight of tertiary amino nitrogen atoms in its essentially linear chain, the oxirane/amine equivalence ratio of said epoxy resin and said polyamine being from 1/1 to about 30/1; and (c) dissolved therein at least 0.5 weight percent, based on the total weight of said epoxy resin and said polyether polyamine, of at least one tin acylate of an aliphatic carboxylic acid having from 2 to 20 carbon atoms and curing said admixture at an elevated temperature.

12. The process of claim 11 in which said admixture also includes a basic aliphatic tertiary amine having a basic ionization constant in water of 25° C. of greater than $10^{-7}$ in an amount up to one-half the weight of said tin acylate.

References Cited

UNITED STATES PATENTS

| 3,436,359 | 4/1969 | Hubin | 260—830 |
| 3,462,393 | 8/1969 | Legler | 260—47 |
| 3,380,881 | 4/1968 | Williamson et al. | 260—47X |
| 3,316,185 | 4/1967 | Reinking | 260—584X |
| 3,236,895 | 2/1966 | Lee | 260—584 |
| 3,201,360 | 8/1965 | Proops et al. | 260—18 |

OTHER REFERENCES

Handbood of Epoxy Resins; Lee & Neville, McGraw-Hill, N.Y. 1967, pp. 7–5, 6, 28, 29 and 30 (copy in Scientific Library TP 118D. E6 L4).

DONALD E. CZAJA, Primary Examiner

C. W. IVY, Assistant Examiner

U.S. Cl. X.R.

260—2ec, 18ep